United States Patent
Yusuf

(10) Patent No.: US 6,915,418 B2
(45) Date of Patent: Jul. 5, 2005

(54) INTERRUPT 21H ROM CLIENT LOADER AND PAYLOAD DELIVERY METHOD

(75) Inventor: Rasheed O. Yusuf, Mission Viejo, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 635 days.

(21) Appl. No.: 09/810,302

(22) Filed: Mar. 16, 2001

(65) Prior Publication Data

US 2004/0015623 A1 Jan. 22, 2004

(51) Int. Cl.⁷ .............................................. G06F 9/24
(52) U.S. Cl. ..................................................... 713/2
(58) Field of Search ............................................ 713/2

(56) References Cited

U.S. PATENT DOCUMENTS

| | | | | |
|---|---|---|---|---|
| 5,307,497 A | * | 4/1994 | Feigenbaum et al. .......... | 713/1 |
| 5,887,164 A | * | 3/1999 | Gupta ........................... | 713/2 |
| 5,913,058 A | * | 6/1999 | Bonola .......................... | 713/2 |
| 6,112,303 A | * | 8/2000 | Stancil .......................... | 713/2 |
| 6,578,142 B1 | * | 6/2003 | Anderson et al. .............. | 713/2 |

OTHER PUBLICATIONS

Peter Szor, "Nexiv_Der", Virus Bulletin, Apr. 1996.*
Compaq, Phoenix, Intel, "BIOS Boot Specification", Version 1.01, Jan. 11, 1996.*
IBM, "PC DOS 7 Technical Update", Document Number GG24-4459-00, pp. 107-141, Feb. 1995.*

* cited by examiner

Primary Examiner—Thomas Lee
Assistant Examiner—Albert Wang

(57) ABSTRACT

An interrupt 21h read only memory (ROM) client loader that allows firmware that is tightly coupled to a platform, such as a BIOS on a motherboard, for example, to present an operating system with installed applications. The interrupt 21h ROM client loader allows ROM-based applications to be installed on a storage device using native (DOS) filing system services of the operating system. The Int 21h ROM client loader comprises software code residing in flash memory that gauges the time when DOS filing system services are stable enough to permit execution of a payload delivery application to deliver the payload to the storage device. The Int 21h ROM client loader interacts with the DOS filing system to determine the time to execute the payload delivery application. This is triggered when an operating system Int 13h call is made to the BIOS which is read by the Int 21h ROM client loader and which thereafter invokes the payload delivery application to deliver the payload to the storage device.

10 Claims, 5 Drawing Sheets

INTERRUPT 21H ROM CLIENT LOADER AND PAYLOAD DELIVERY METHOD

BACKGROUND

The present invention relates generally to computer systems and methods, and more particularly, to an interrupt 21h read only memory (ROM) client loader and payload delivery method for use in computer systems.

A previous mechanism used to install ROM-based applications required a fully functional filing system module to be embedded in the read only memory (ROM). Boot managers such as Partition Magic, for example, available from Powerquest, use the native filing system of the operating system to access multiple operating system partitions. Partition Magic is partitioning software that allows creation, resizing and merging of partitions on a hard drive without destroying data, and may be used to organize and protect data, run multiple operating systems convert file system types, and fix partition table errors.

A number of disadvantages are associated with the prior art mechanism when installing ROM-based applications to an operating system environment. Disadvantages include use of a third party filing system, use of over 25 kilobytes of valuable ROM space, inconsistencies in writing to specific operating system drive letter/partition configurations, SCSI device support was unreliable, and it required developing filing system expertise to resolve newly uncovered issues.

It would be desirable to have an application loader that does not require the use of a filing system module embedded in the read only memory. It would be desirable to have an application loader that overcomes the limitations of the prior art mechanism discussed above. It is therefore an objective of the present invention to provide interrupt 21h read only memory (ROM) client loader and payload delivery method for use in computer systems.

SUMMARY OF THE INVENTION

To accomplish the above and other objectives, the present invention provides for an interrupt (Int) 21h read only memory (ROM) client loader. The interrupt 21h read only memory (ROM) client loader allows ROM-based applications (payloads) to be installed on a storage device or medium, such as a hard disk drive that is running Microsoft Windows 9x, for example, using native filing system services of the operating system. This capability allows a piece of firmware that is tightly coupled to a platform, such as a BIOS on a motherboard, for example, to present an operating system, such as Microsoft Windows, with installed applications.

A computer system employing the interrupt 21h read only memory (ROM) client loader comprises a flash memory that contains a payload delivery application and a filing system interface. The computer system also comprises a disk operating system (DOS) filing system and a basic input/output system (BIOS) that provides interrupt 13h services.

The Int 21h ROM client loader comprises software code residing in flash or shadow memory that gauges the time when the DOS filing system is stable enough to permit execution of the payload delivery application that delivers the ROM-based payload to the storage device. The Int 21h ROM client loader interacts with the DOS filing system to properly determine the time to execute the payload delivery application. This is triggered when an operating system Int 13h call is made to the BIOS which is read by the Int 21h ROM client loader and which thereafter launches the payload delivery application to deliver the payload to the storage device.

More particularly, exemplary computer apparatus in accordance with the present invention comprises a payload delivery application for delivering a payload to a storage device, a disk operating system (DOS) including a DOS filing system, a filing system interface between the payload delivery application and the DOS filing system for initiating open, close, read and write tasks with regard to the storage device, and a basic input/output system (BIOS) that provides interrupt 13h services. An Int 21h read only memory (ROM) client loader in accordance with the present invention interfaces with the payload delivery application and the BIOS that is operative when the computer apparatus is turned on, and which gauges a time when the DOS filing system is stable enough to permit communication with the storage device and which thereafter invokes the payload delivery application to deliver the payload to the storage device.

An exemplary method implemented by the computer apparatus and Int 21h ROM client loader operates to deliver the payload to the storage device in the following manner. The computer system is turned on to initiate a power-on-self-test (POST) procedure. An original interface to the storage device is saved. The original interface to the storage device is hooked using the Int 21h ROM client loader during the POST procedure. The disk operating system is loaded at the conclusion of the POST procedure. The storage device interface is called from the disk operating system. The payload delivery program is called in response to the storage device interface call by the Int 21h ROM client loader. The payload delivery program is executed to deliver the payload to the storage device. After payload loading is complete, the stored storage device interface is restored to the storage device with the Int 21h ROM client loader.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
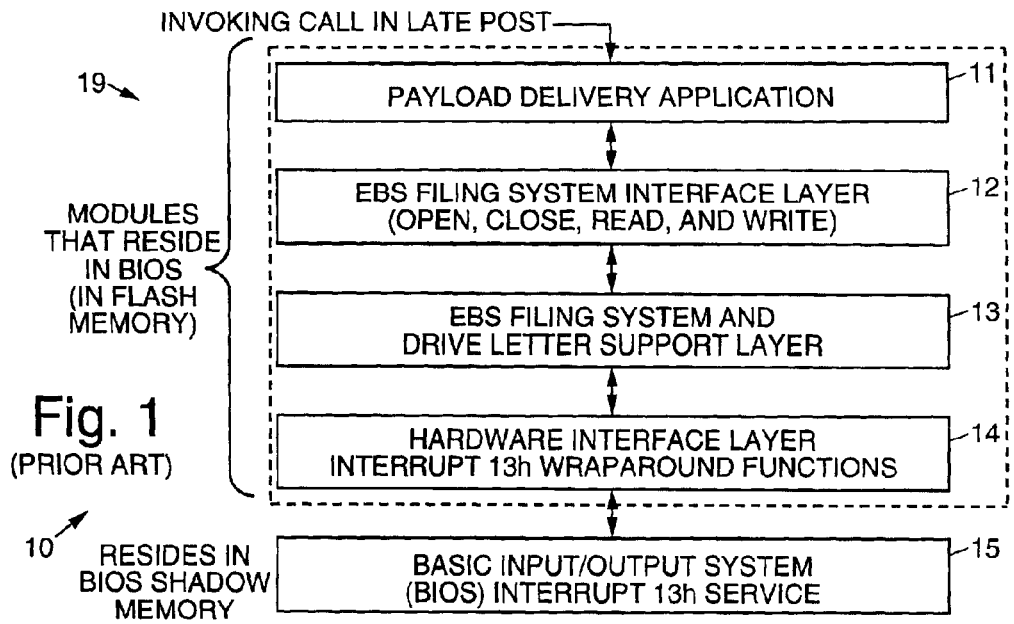
FIG. 1 illustrates the architecture of a prior art ROM client loader.

Referring to the drawing figures, FIG. 1 illustrates the architecture of an exemplary prior art read only memory (ROM) client loader 10 previously developed by the assignee of the present invention. The prior art ROM client loader 10 is a single application that is part of a basic input/output system (BIOS) that resides in flash memory 19 (or a flash part 19) of a computer system. Modules that reside in the BIOS in the flash memory 19 include a payload delivery application 11, an EBS filing system interface layer 12, an EBS filing system and drive letter support layer 13, and a hardware interface layer 14. The basic input/output system (BIOS) module 15 is loaded into BIOS shadow memory. The prior art ROM client loader 10 in invoked by an invoking call late in a power-on-self-test (POST) procedure that runs after the computer system is turned on.

The EBS filing system interface layer 12 and the EBS filing system and drive letter support layer 13 were developed by EBS, Inc. and were modified by the assignee of the present invention to the extent necessary to properly operate within the BIOS. The EBS filing system interface layer 12 requires a large (on the order of 25 kilobytes) amount of space in the read only memory 19. The EBS filing system interface layer 12 implements open, close, read, and write operations on a hard disk drive. The hardware interface layer 14 implements interrupt (Int) 13h wraparound functions. The interrupt 13h wraparound functions include reads and writes from the hard disk drive.

Figure 2:
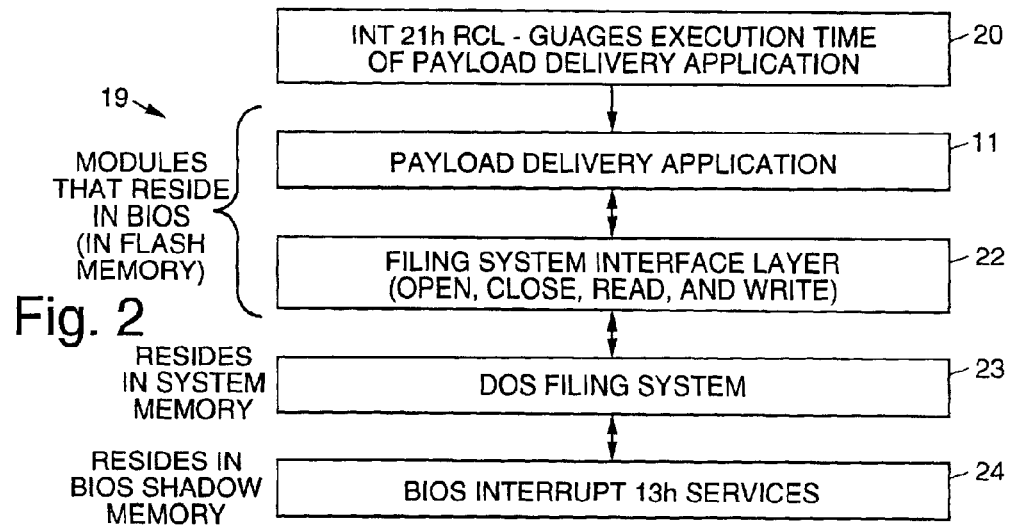
FIG. 2 illustrates the architecture of an exemplary interrupt 21h ROM client loader in accordance with the principles of the present invention.

FIG. 2 illustrates the architecture of an exemplary interrupt Int 21h read only memory (ROM) client loader 20 in accordance with the principles of the present invention. A computer system employing the Int 21h read only memory (ROM) client loader 20 comprises a payload delivery application 11 and a filing system interface layer 22 that reside in the BIOS in flash memory 19. The computer system also includes a disk operating system (DOS) filing system 23 (DOS kernel) that resides in system memory, and a basic input/output system (BIOS) interrupt (Int) 13h module 24 or handler 24 that resides in BIOS shadow memory.

A payload (program or application) that is to be loaded onto a hard disk drive of the computer system is stored in the flash memory 19. The filing system interface layer 22 implements open, close, read, and write operations. The filing system interface layer 22 is much smaller than the filing system and drive letter support layer 13 used in the prior art loader 10. In the Int 21h ROM client loader 20, certain filing system functions provided by the prior art filing system and drive letter support layer 13 are provided by the DOS filing system 23.

The Int 21h ROM client loader comprises software code that gauges the time when the DOS filing system 23 is stable enough to permit execution of the payload delivery application 11 that delivers the ROM-based payload to a storage device or medium, such as a hard disk drive. The Int 21h ROM client loader 20 interacts with the DOS filing system 23 to properly determine the time to execute the payload delivery application 11. As will be explained in more detail below, execution is triggered when an operating system Int 13h call is made to the BIOS which is read by the Int 21h ROM client loader 20 which thereafter launches the payload delivery application 11.

The Int 21h ROM client loader 20 allows ROM-based applications (the payload) to be installed on the storage device (such as a hard or floppy disk drive, for example) that is running a Microsoft Windows 9x operating system, for example, using native filing system services of the operating system. This capability allows a piece of firmware that is tightly coupled to a platform, such as the system BIOS located on a motherboard of the computer system, for example, to present an operating system, such as the Microsoft Windows 9x operating system, with installed applications.

Figure 2A:
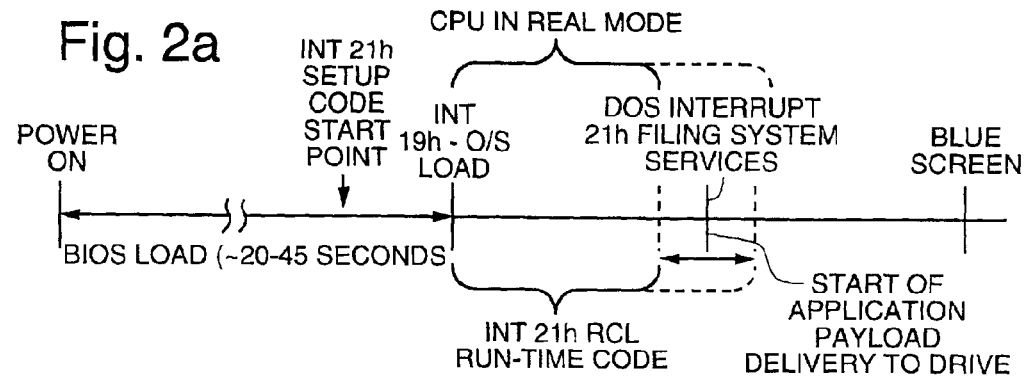
FIG. 2a is a timing diagram that illustrates operation of the present ROM client loader to load a payload and operating system onto a computer system.

FIG. 2a is a timing diagram that illustrates operation of the exemplary Int 21h ROM client loader 10, and loading of the payload and Windows 9x operating system on the computer system. The computer system is powered on (illustrated by the leftmost line in FIG. 2a) which starts a power-on-self-test (POST) procedure. During the next 20–45 seconds, depending upon the specific Windows 9x operating system that is installed, the POST procedure is inoperative and system firmware or BIOS is loaded.

At a point late in the POST procedure, when hard disk operations are accessible, Int 21h setup code of the Int 21h ROM client loader 10 starts. The Int 21h setup code runs until the occurrence of an interrupt (Int) 19h call. The interrupt (Int) 19h call causes the BIOS to start loading the operating system. The central processing unit (CPU) of the computer system is operating in REAL mode at this time. The Int 21h run-time code of the ROM client loader 10 also starts to run at this time.

At some time after the BIOS starts loading the operating system, illustrated by the DOS Int 21 line, at the time that filing system services are available, and prior to substantial loading of the operating system, Int 21h run-time code of the Int 21h ROM client loader 10 calls a payload delivery application 11 that operates to deliver the payload (program or application) in the background onto the hard disk drive of the computer system. At the point that the DOS Int 21h services are available, it is safe to perform filing system reads and writes to the hard disk drive, and the Int 21h ROM client loader 10 accurately determines this point and delivers the payload thereafter.

The Int 21h run-time code of the Int 21h ROM client loader 10 determines when the DOS Int 21 services are available, which is different for each different Win 9x operating system. This is illustrated by the vertical dashed lines and the horizontal arrow, which illustrate that this point in time varies with each particular operating system.

The delivery of the payload onto the hard disk drive or other storage device occurs prior to occurrence of the Windows blue screen (or cloud screen) that is displayed on a computer monitor. The operations performed by the Int 21h ROM client loader 10 function to simulate a disk insertion to permit copying of the payload onto the hard disk drive.

A key aspect of the present invention is to make calls to the DOS filing system 23 or kernel 23 from within the BIOS Int 13h services 24 until the filing system 22 is determined to be active. At this point, the ROM client loader 20 is invoked and the DOS native filing system 23 is used as a mechanism to perform file read and write operations to the system.

Figure 3:
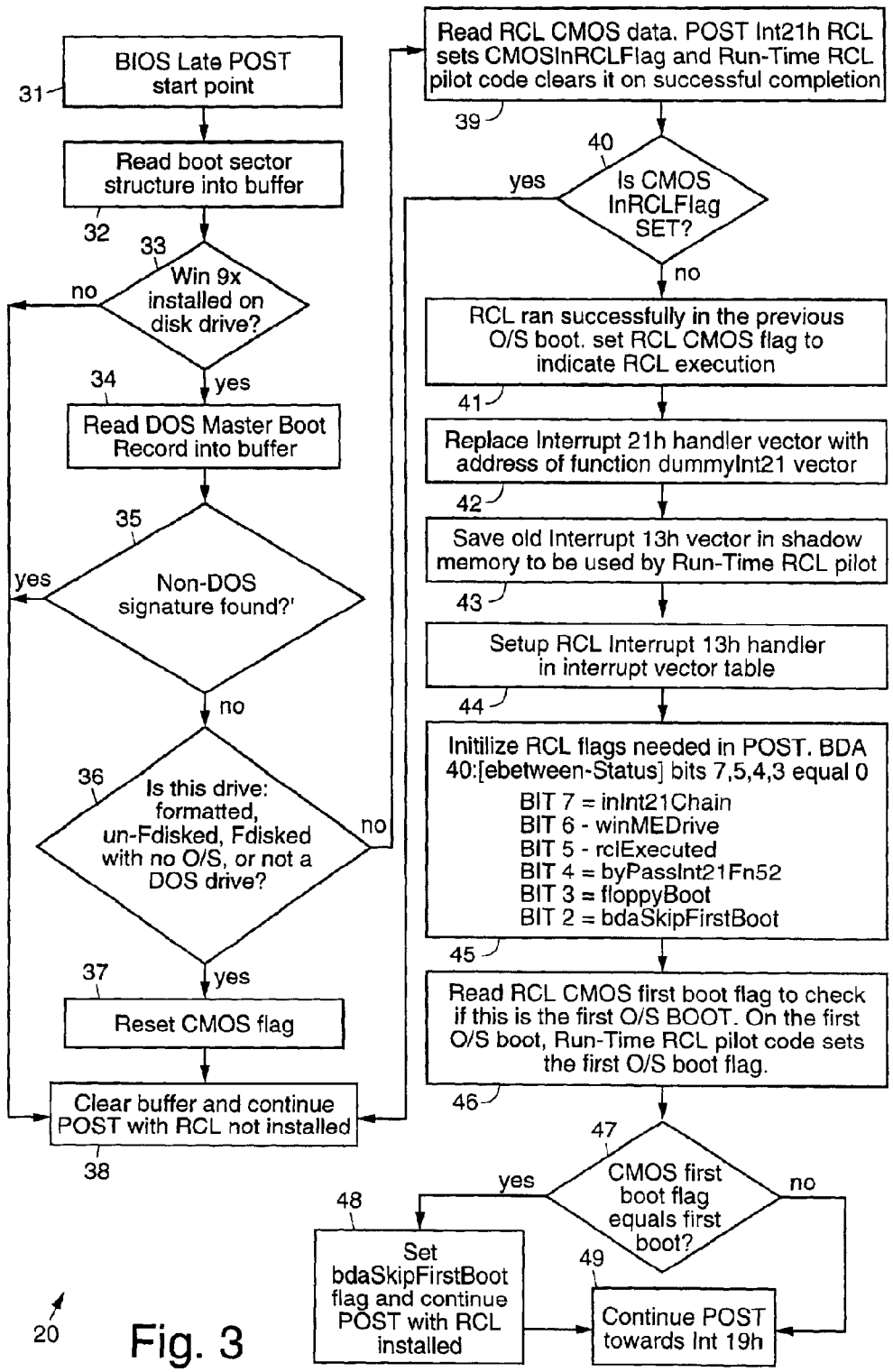
FIG. 3 is a flow diagram illustrating steps that implement pilot code used in a reduced-to-practice embodiment of the present interrupt 21h ROM client loader.

FIG. 3 is a flow diagram illustrating steps that implement pilot code used in a reduced-to-practice embodiment of the present interrupt 21h ROM client loader 20. The exemplary pilot code of the Int 21h ROM client loader 20 is initiated late in the power-on-self-test (POST) procedure 31 of the BIOS. A boot sector structure is read 32 into a buffer.

It is then determined 33 if a Windows (Win 9x) operating system is installed on a storage device, such as a disk drive. If the Windows operating system is not installed, the buffer is cleared 38 and the POST procedure 31 is continued with the ROM client loader 20 not installed.

If the Windows operating system is installed, a DOS Master Boot Record (MBR) is read 34 into the buffer. Then, a determination 35 is made whether there is a non-DOS signature on the disk drive which determines if it is a DOS drive. If a non-DOS signature is found (yes), the buffer is cleared 38 and the POST procedure 31 is continued with he ROM client loader 20 not installed.

If no DOS signature is found (no), it is determined 36 if the drive is formatted, un-Fdisked, Fdisked with no operating system, or is not a DOS drive (such as a Unix drive). If these conditions are present, then a CMOS flag (which allows remote storage of control and status information) is reset 37 (wherein the CMOS first boot flag and CMOS Int 21h RCL flag are cleared because the disk drive is not supported), and the buffer is cleared 38. The POST procedure 31 is continued with the Int 21h ROM client loader 20 not installed.

If the conditions found in decision block 37 are not present, Int 21h ROM client loader CMOS data is read, a CmosInRCL flag is set and run-time ROM client loader startup code clears the flag on successful completion, as indicated in step 39. Then it is determined 40 if the ROM client loader CmosInRCL flag is set. If the Int 21h ROM client loader CmosInRCL flag is set (yes), the buffer is cleared 38 and POST is continued with the ROM client loader 20 not installed.

Thus in a prior operating system boot, the Int 21h ROM client loader 20 completed successfully. If the Int 21h ROM client loader 20 causes any boot problem with the operating system, then it is turned off permanently, otherwise operation continues.

If the ROM client loader CmosInRCL flag is not set (no), and the ROM client loader 20 ran successfully in a previous booting of the operating system, a ROM client loader CMOS flag is set 41 to indicate ROM client loader execution. The interrupt 21h handler vector is replaced 42 with the address of a function (Fn) dummyInt21 vector. The old interrupt 13h vector is saved 43 in a shadow memory for use by the run-time ROM client loader pilot code.

The ROM client loader interrupt 13h handler is set up 44 in an interrupt vector table. ROM client loader flags that are need in the POST procedure 31 are initialized 45. The BIOS data area (BDA) 40 (a memory area that holds BIOS configuration and status information during each boot session) BDA 40: [ebeween_status] bits 7, 5, 4, 3 are set equal to 0, where bit 7 corresponds to the inInt21 chain, bit 6 corresponds to the Windows (WinME) drive, bit 5 corresponds to rclExecuted, bit 4 corresponds to byPassInt21Fn52, bit 3 corresponds to floppyBoot, and bit 2 corresponds to bdaSkipFirstBoot.

Then, as is indicated in step 46, the ROM client loader CMOS first O/S boot flag are read to check if this is the first boot of the operating system. On the first boot of the operating system, the run-time ROM client loader pilot code sets the first operating system boot flag.

A determination 47 is made if the first O/S boot flag indicates that it is or is not the first boot. If it is the first boot, a bdaSkipFirstBoot flag is set 48 and the POST procedure 31 is continued 49. If it is not the first boot, the POST procedure 31 is continued 49 toward Int 19h.

Figure 4A:
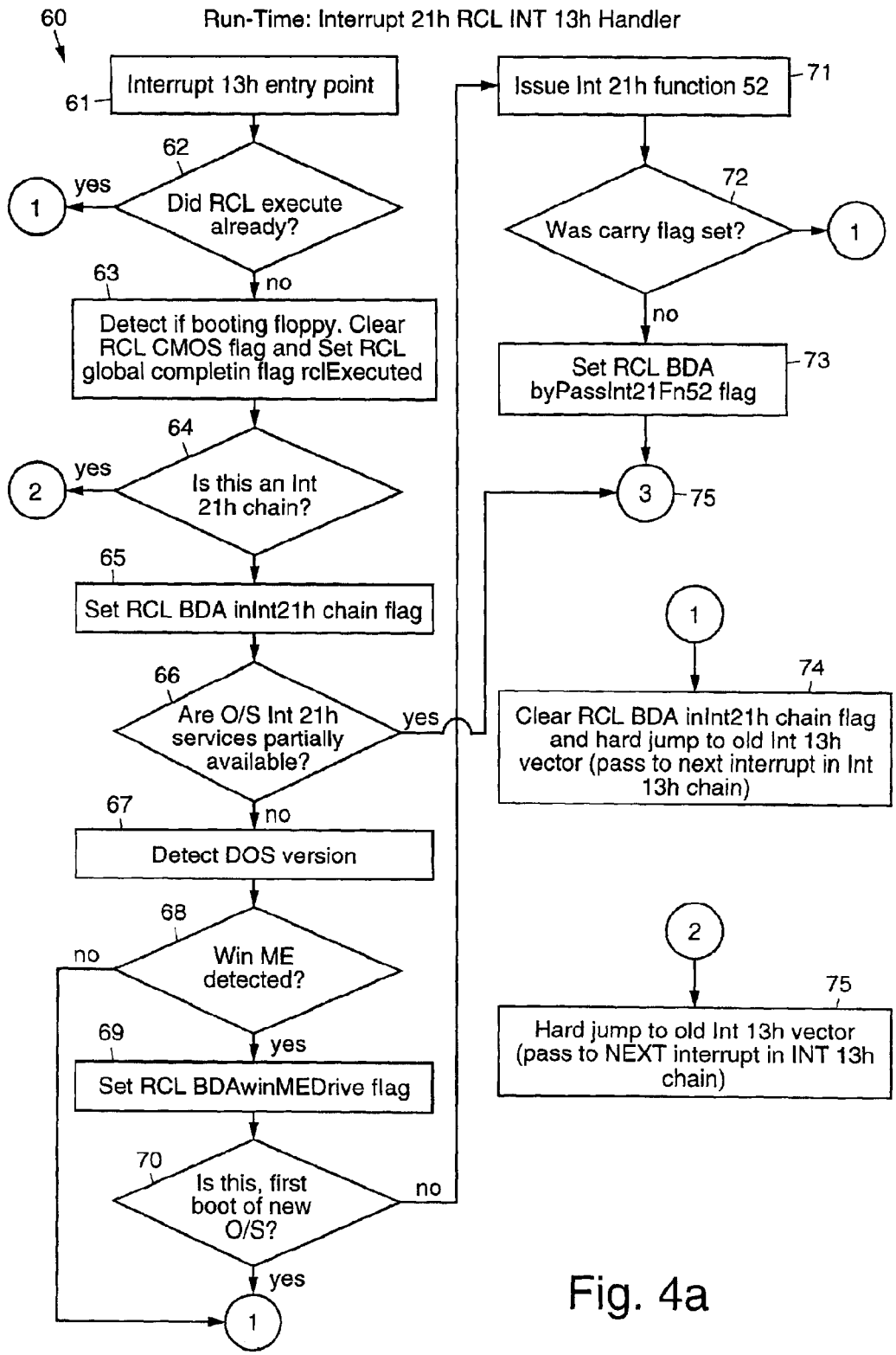
FIGS. 4a and 4b comprise a flow diagram that illustrates run-time code of the reduced-to-practice embodiment of the interrupt 21h ROM client loader.
Figure 4B:
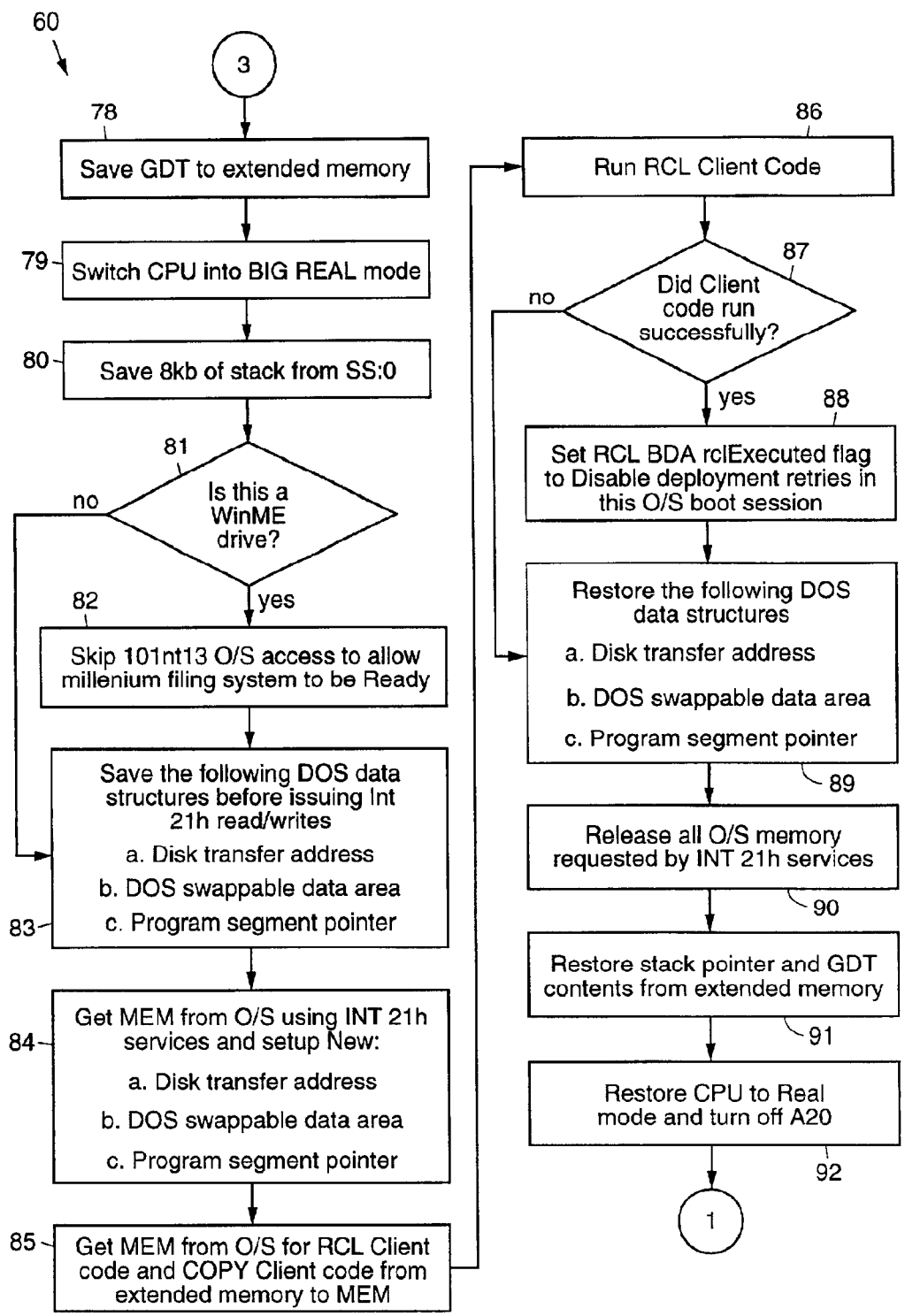

FIGS. 4a and 4b comprise a flow diagram that illustrates exemplary run-time code of the Int 21h ROM client loader 20. The exemplary run-time code starts at an interrupt 13h entry point 61 (shown as the pilot start point in FIG. 2a). A determination 62 is made if the ROM client loader 20 has previously executed. If the Int 21h ROM client loader 20 has executed (yes), then the BDA inInt21 Chain flag is cleared 74, and a jump is made to the old interrupt 13h vector, which passes to the next interrupt in the interrupt 13h chain.

If the Int 21h ROM client loader 20 has not executed (no), it is determined 63 if the computer system is booting from a floppy drive, the RCL CMOS flag is cleared, and the a global RCL completion flag rclExecuted is set. Then, a determination 64 is made if an interrupt 21 chain is being executed. If this is an interrupt 21h chain (yes), then a hard jump is made to the old interrupt 13h vector, which passes to the next interrupt in the interrupt 13h chain.

If this is not an interrupt 21 chain (no), then the ROM client loader BDA inInt21chain flag is set 65. Then, a determination 66 is made whether operating system Int 21h services are partially available. An Int 221h Fn52 call can be issued only once, so a check is made if this has been done. If the Int 21h services are not partially available (no), the DOS version is determined 67. Then, a determination 68 is made if the Windows millennium edition (Win ME) is detected.

If the Windows millennium edition is not detected, then the BDA inInt21 Chain flag is cleared 74, and a jump is made to the old interrupt 13h vector, which passes to the next interrupt in the interrupt 13h chain. If the Windows millennium edition is detected, then the ROM client loader BDA winMEDrive flag is set 69.

Then, a determination 70 is made if this is the first boot of the new operating system. If this is the first boot of the new operating system, then the BDA inInt21 Chain flag is cleared 74, and a jump is made to the old interrupt 13h vector, which passes to the next interrupt in the interrupt 13h chain.

If this is not the first boot of the new operating system, an interrupt 21h function 52 call is issued 71. Then, a determination 72 is made if the carry flag is set. If the carry flag is set, the BDA inInt21 Chain flag is cleared 74, and a jump is made to the old interrupt 13h vector, which passes to the next interrupt in the interrupt 13h chain.

If the carry flag is not set, then the BDA byPassInt21Fn52 flag is set 73. When the BDA byPassInt21Fn52 flag is set 73, or if Int 21h services are partially available as determined in step 66, then (and referring to FIG. 4b) then the global descriptor table (GDT) is saved 78 to extended memory. The central processing unit (CPU) is switched 79 into BIG REAL mode, and 8 kilobytes of stack from SS:0 is saved 80. Then a determination is made 81 if this is a WinME Drive.

It this is a WinME Drive (yes), then operating system access by way of 10 INT 13h is skipped 82 to allow the millennium filing system to be ready. Then, or in the event that this is not a WinME Drive (no), several DOS data structures are saved 83 before issuing INT 21h reads and writes, including disk transfer address, DOS swappable data area and program segment pointer.

Then, memory (MEM) is obtained 84 from the operating system using INT 21h services and a new disk transfer address, DOS swappable data area and program segment pointer are set up. Then memory (MEM) is obtained 85 from the operating system for the ROM client loader Client code and the Client code is copied from extended memory into the memory obtained 84 from the operating system.

Thus, steps 61–84 operate to determine that O/S filing system read and write operation are safe to complete. If this is the case, then it is safe to deliver the payload to the storage device.

The ROM client loader Client code is then run 86. A determination 87 is made if the Client code ran successfully. If the Client code ran successfully, the BDA rclExecuted flag is set 88 to disable deployment retries in the current operating boot session. Then, after the BDA rclExecuted flag is set 88 to, or if the Client code did not run successfully, DOS data structures are restored 89 from the disk transfer address, the DOS swappable data area and the program segment pointer.

Then, all operating system memory requested by INT 21h services are released 90. The stack pointer and GDT contents from the extended memory are restored 91. The central processing unit (CPU) is restored 92 to REAL mode, and address line 23 (A20), which provides access to the extended memory, is turned off. Then, the BDA inInt21 Chain flag is cleared 74, and a jump is made to the old interrupt 13h vector, which passes to the next interrupt in the interrupt 13h chain.

As should be apparent to those skilled in the art, the following steps are sequentially performed during the computer system boot process. A master boot record (MBR) is loaded by the BIOS. The master boot record (MBR) loads the DOS boot record (DBR). The DOS boot record loads at the beginning of an IO.SYS file. The IO.SYS file loads the remainder of itself and initializes. The disk operating system (DOS) processes the Config.sys file. The disk operating system (DOS) processes the Autoexec.bat file. Finally, the command.com or Windows file loads.

At some time after the IO.SYS file loads the remainder of itself, but prior to processing of the Config.sys file (the DOS INT 21 line in FIG. 2a), interrupt 21h services provided by the BIOS interrupt 13h module 24 become available. The ROM client loader 20 may use these services to access a hard disk drive and allocate memory to perform its operations. It is important to note that the DOS filing system 23 is still running in REAL mode at this time, and no memory managers are active.

During the power-on-self-test (POST) procedure, the following operations may be performed. A custom INT 21 handler 24 may be installed that returns a carry error code. This custom INT 21 module 24 would remain active until the point in time when DOS installs a valid INT 21h module 24. The payload data (program or application) and read only memory (ROM) client module 20 may be decompressed to a location in extended memory that can easily be found and validated.

A hook added to a BIOS INT 13h entry point dispatcher monitors the response from an INT 21h, function 52h invocation to monitor operating system kernel loading. Since a dummy INT 21h interface was previously installed, this call carry-exits until the operating system installs its own version of this module or handler.

Once the INT 21h, FN 52h call is successful, it is possible to use INT 21h to obtain memory from the operating system, copy ROM Client code and payload files to memory, and invoke ROM Client code to perform filing system read and write operations to allow installation of the ROM-based application to the disk drive.

One advantage of the present read only memory (ROM) client loader 20 over the prior art loader 10 is that it uses the DOS native filing system 23 to access the disk drive. Another advantage of the present read only memory (ROM) client loader 20 is that it saves over twenty-two kilobytes of filing system/drive letter support code (uncompressed) that would otherwise have to be in the BIOS in the ROM 19.

Another advantage of the present read only memory (ROM) client loader 20 is that deployment takes place while the operating system is loading which virtually eliminates delay in loading the ROM client loader 20 after POST. Another advantage of the present read only memory (ROM) client loader 20 is that it relies on operating system assignment of drive letters and the DOS filing system 23. The prior art implementation uses code to make a best guess as to what the drive letters will be.

Figure 5:
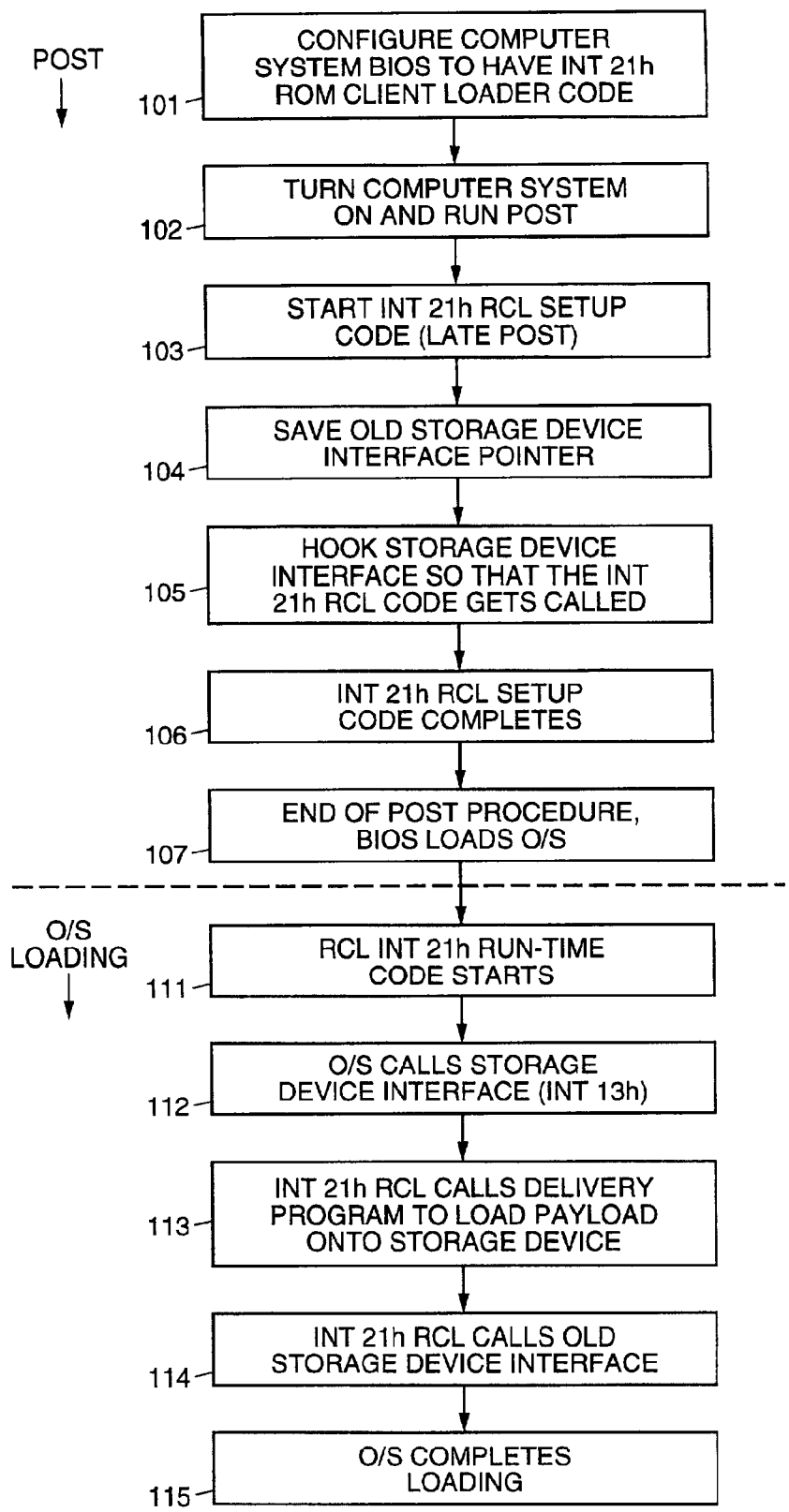
FIG. 5 illustrates basic steps that may be employed to implement an interrupt 21h ROM client loader in accordance with the principles of the present invention.

Referring now to FIG. 5, it illustrates basic steps 100 that may be employed to implement an interrupt 21h ROM client loader 20 in accordance with the principles of the present invention. The steps required to implement the interrupt 21h ROM client loader 20 are as follows.

A computer system is configured 101 to have a BIOS that includes an interrupt (Int) 21h ROM client loader 20. The computer system is turned on which initiates 102 a power-on-self-test (POST) procedure. ROM client loader Int 21h startup code is run 103 late in the POST procedure. An original storage device interface (or pointer) is saved 104. The original storage device interface is hooked 105 by the startup code so that the Int 21h RCL run-time code gets called. The Int 21h RCL setup code completes 106. The POST procedure ends and the BIOS starts to load 107 the operating system.

Once the BIOS starts to load 107 the operating system, the Int 21h ROM client loader Int 21h run-time code starts 111. The operating system calls 112 the storage device interface (Int 13h). The ROM client loader Int 21h run-time code calls 113 a payload delivery program to load a payload (program or application) onto the storage device. After payload loading is complete, the Int 21h ROM client loader run-time code calls 114 the old storage device interface. Then, the operating system completes 115 loading.

Thus, an interrupt 21h read only memory (ROM) client loader for use in computer systems has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. An apparatus, comprising:
   a payload delivery application operative to deliver a payload to a storage device;
   a disk operating system (DOS) including a DOS filing system;
   a filing system interface between the payload delivery application and the DOS filing system operative to initiate open, close, read and write tasks with regard to the storage device;
   a basic input/output system (BIOS) operative to provide interrupt services; and
   a read only memory (ROM) client loader, that interfaces with the payload delivery application and the BIOS, that is operative when the apparatus is turned on, and which gauges a time when the DOS filing system is stable enough to permit communication with the storage device by monitoring for a predetermined operating system interrupt call to the BIOS.

2. The apparatus recited in claim 1 which further comprises flash memory, and wherein the payload delivery application delivers a ROM-based payload stored in the flash memory to the storage device.

3. The apparatus recited in claim 1 wherein the ROM client loader is an Int 21h ROM, client loader that determines when the DOS filing system is stable by monitoring when an Int 13h call is made to the BIOS by the operating system.

4. A method of delivering a payload to a storage device of a computer system comprising a payload delivery application, a basic input/output system (BIOS) that provides interrupt 13h services, a disk operating system (DOS) including a DOS filing system, and an interrupt (Int) 21h read only memory (ROM) client loader, the method comprising the steps of:

turning on the computer system to initiate a power-on-self-test (POST) procedure;

saving an interface to the storage device;

hooking the interface to the storage device using the Int 21h ROM client loader during the POST procedure;

loading the disk operating system at the conclusion of the POST procedure;

calling the storage device interface from the disk operating system;

calling the payload delivery program using the Int 21h ROM client loader in response to the storage device interface call;

executing the payload delivery program to deliver the payload to the storage device; and after payload loading is complete, restoring the stored storage device interface with the Int 21h ROM client loader.

5. The method recited in claim 4 wherein the Int 21h ROM client loader detects the storage device interface call from the disk operating system to determine the time when the DOS filing system is stable enough to permit execution of the payload delivery application to deliver the payload to the storage device.

6. The method recited in claim 4 wherein the storage device interface call by the operating system comprises an Int 13h call which is read by the Int 21h ROM client loader and which launches the payload delivery application to deliver the payload to the storage device.

7. The method recited in claim 4 wherein the Int 21h ROM client loader comprises Int 21h RCL startup code and Int 21h RCL run-time code and wherein:

the Int 21h RCL startup code is run late in the POST procedure;

the Int 21h RCL startup code hooks the interface to the storage device and save the interface to the storage device;

the Int 21h RCL run-time code starts at the conclusion of the POST procedure;

the Int 21h RCL run-time code detects calling of the storage device interface by the disk operating system; and the Int 21h RCL run-time code invokes the payload delivery program.

8. A method of delivering a payload to a storage device of a computer system, comprising the steps of:

configuring the computer system to have a payload delivery application for delivering the payload to the storage device, a disk operating system (DOS) including a DOS filing system, a filing system interface for interfacing between the payload delivery application and the DOS filing system for performing open, close, read and write tasks on the storage device, and basic input/output system (BIOS) that provides interrupt 12h services that interfaces with the DOS filing system, and an Int 21h read only memory (ROM) client loader (RCL) comprising Int 21h RCL startup code and Int 21h RCL run-time code;

turning on the computer system to initiate a power-on-self-test (POST) procedure;

running the Int 21h RCL startup code late in the POST procedure;

saving an interface to the storage device;

hooking the interface to the storage device with the startup code so that the Int 21h RCL running-time code can get called;

loading the disk operating system at the conclusion of the POST procedure;

starting the Int 21h RCL run-time code;

calling the storage device interface from the disk operating system;

calling the payload delivery program using the RCL run-time code in response to the storage device interface call;

executing the payload delivery program to deliver the payload to the storage device; and after payload loading is complete, restoring the stored storage device interface with the Int 21h ROM client loader run-time code.

9. The method recited in claim 8 wherein the Int 21h RCL run-time code detects the storage device interface call form the disk operating system to determine the time when the DOS filing system is stable enough to permit execution of the payload delivery application to deliver the payload to the storage device.

10. The method recited in claim 8 wherein the storage device interface call by the operating system comprises an Int 13h call which is read by the Int 21h RCL run-time code and which invokes the payload delivery application to deliver the payload to the storage device.

* * * * *